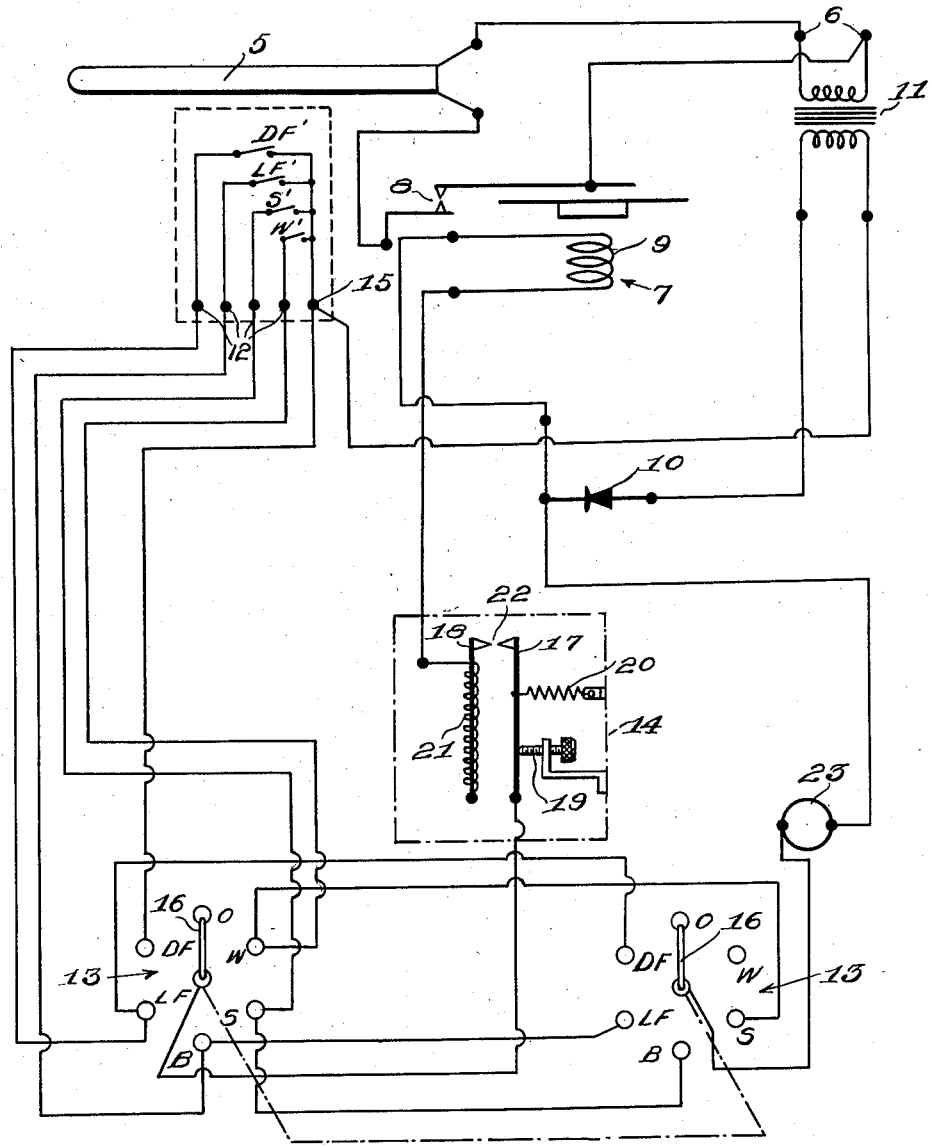

United States Patent Office 2,857,500
Patented Oct. 21, 1958

2,857,500

ELECTRIC CONTROL SYSTEMS FOR ELECTRICAL HEATERS

Richard Collier, Esher, England

Application December 20, 1955, Serial No. 554,340

Claims priority, application Great Britain November 10, 1955

1 Claim. (Cl. 219—20)

This invention concerns electrical control systems for heating means and more particularly concerns electrical heating means for cooking and treating vessels such, for example, as electric hot-plates. It is a common practice to incorporate a temperature-sensitive switch in the control systems of electrical hot-plates to limit the maximum temperature of the heating element or vessel and this invention is particularly applicable to such control systems.

This invention has for its object to provide an improved control system whereby a wide range of temperatures of operation may be selected in a simple manner. For instance, as applied to an electric hot-plate, temperatures may readily be selected from lukewarm (for warming plates or keeping cooked food warm) to about 400° F., as used for deep frying.

The invention is especially adapated for control of a hot-plate in conjunction with the control system set forth in the specification of application No. 495,299, now abandoned. In said specification there is disclosed a control system for an electric hot-plate comprising a plurality of temperature-sensitive switches operative at different temperatures, the switches being selectively connectible into the control circuit by a multi-position control switch so that the system operates at a desired temperature. For example the system may be adapted for warming up to 180° F., for simmering at a maximum temperature of 205° F., for boiling, for low frying at 280° F. and for deep frying at 400° F. With this arrangement the temperature-sensitive switch for each operating condition limits the maximum temperature which is attainable.

An object of this invention is to enable a range of temperatures to be selected for each operating condition the maximum temperature being limited for each operating condition by a temperature-sensitive switch as in application No. 495,299, now abandoned.

According to this invention the supply of heating medium to the heating means is controlled by a device which is electrically actuated under control of a regulator comprising a temperature-sensitive switch the actuation of which is controlled by an electrical heating element in the switch circuit so that the switch functions cyclically. It may be arranged that provision be made for varying the rate of operation of the switch.

Preferably the cyclic regulator is connected into circuit with a temperature-sensitive switch which responds to the temperature of the heating means (or a vessel to be heated thereby) to limit the maximum attainable temperature, adjustment of the cyclic regulator varying the operating temperature up to said maximum value.

A practical application of the invention will now be described, by way of example only, with reference to the accompanying drawing which shows a circuit diagram for a control system for an electric hot-plate according to this invention and which incorporates a plurality of temperature-sensitive switches for operation as set forth in the specification of application No. 495,299, now abandoned.

Referring to the drawing: the hot-plate, which may be an electric heating element enclosed in a metal tube, is indicated at 5 and is connected to a main supply 6 through a relay 7 having main contacts 8 and a low-voltage exciting coil 9. The coil 9 is energized from a rectifier 10 connected to a step-down transformer 11 fed from the mains 6.

Four temperature-sensitive switches DF′, LF′, S′ and W′ in the form of bimetallic strips are arranged as set forth in the specification of application No. 495,299, now abandoned, to engage through a heat-conducting plate, the bottom of a cooking vessel placed on the hot-plate 5 so that each temperature-sensitive switch responds to the temperature of a wall of the vessel. Each switch is separately connected to a contact 12 and through a multi-position control switch 13 to the cyclic regulator (generally indicated at 14) and thence to the rectifier 10 and transformer 11, a contact 15 common to all the temperature-sensitive switches being connected to the transformer 11. It is to be noted that the circuits of the temperature-sensitive switches DF′, LF′, S′ and W′ are fed from the step-down transformer 11.

On adjustment of arm 16 of switch 13 one or another of the bimetallic strips can be brought into use for controlling the maximum temperature for the selected operating condition (warm, simmer, boil and so on) a circuit in each case being completed through the appropriate bimetallic strip and rectifier 10 to transformer 11 with the result that relay 7 is energised and contacts 8 closed. Hot-plate 5 is thus connected into the mains 6 and will so remain until the selected maximum operating temperature is exceeded whereupon the control circuit is broken at the appropriate bimetallic strip, relay 7 is thereupon de-energized and the hot-plate is disconnected from the mains supply. The bimetallic strips are arranged to actuate at a selected maximum temperature each for the operating condition appropriate to it as selected by switch 13.

The cyclic regulator comprises a contact arm 17 which is adjustable towards and away from arm 18, for example as diagrammatically illustrated, by a screw 19, the arm 17 being urged away from arm 18 by a spring 20. Arm 18 is a bimetallic strip that is heated by element 21 which is in series with transformer 11, contacts 22 of arm 17, 18 and arm 16 of switch 13 so that while a circuit is made through the switch 13 and appropriate bimetallic strip associated with contact 12 element 21 will be in circuit (contacts 22 being assumed to be closed). The element 21 when heated results in arm 18 moving to separate contacts 22 thereby breaking the circuit to the heating element 21. As the element cools the contacts re-engage and the cycle is repeated. The rate of the cyclic opening and closing of contacts 22 depends upon the distance apart of the contacts which is varied by screw 19.

Each time the contacts 22 close relay 7 is energized and hot-plate 5 connected to the mains supply 6. Accordingly the heating effect at the hot-plate is controlled by cyclic regulator 14, the rate of supply of power to the hot-plate being determined by the rate of operation of the regulator. In practice it may be arranged that the rate of power supply is variable from 10% to 80%.

With the arrangement described the screw 19 is adjusted by a knob moving relatively to a graduated scale (divided for example into ten steps) and in use the housewife or operator adjusts the switch 13 to select warm, simmer, boil, low fry or deep fry and for the operating condition selected adjusts screw 19 to a desired setting. The cyclic regulator will then function to control the supply of power to the hot-plate 5 so as to maintain a desired temperature the maximum temperature being determined by the bimetallic strip associated with the appropriate contact in circuit with the selector switch 13.

Thus, in a practical arrangement, referred to by way of example only, when selector switch 13 is set to "warm" (contact W) the bimetallic strip of contact 12 will limit the temperature to a maximum of 180° F. and the cyclic regulator is adjustable to ensure that the hotplate operates at from a gentle heat (sufficient for warming plates) up to 180° F. When switch 13 is set for simmer (contact S) a circuit is made through contact W (the contacts of the switch 13 being cross connected as shown) whereupon the hot-plate 5 is rapidly brought up to 180° F. whereupon the "warm" bimetallic strip opens and the mains circuit to the hot-plate is under control of the regulator 14 and the "simmer" bimetallic strip which limits the temperature to a maximum of 205° F. Adjustment of regulator 14 by screw 19 enables the temperature of the hot-plate or a vessel thereon to be varied from 180° F. to 205° F. Similarly when switch 13 is set for boil (contact B) the hot-plate is rapidly brought to 205° F. as determined by the "simmer" bimetallic strip (contacts B and S being interconnected) and regulator 14 is adjustable to vary the operating temperature from 205° F. to a temperature determined by the "boil" bimetallic strip. Again for "low fry" (contact LF) the temperature is rapidly raised to 300° F. (as determined by the "boil" bimetallic element) and is variable from 300° F. to 380° F. by regulator 14, the maximum temperature of 380° F. being determined by the "low fry" bimetallic element. With "deep fry" (contact DF) the temperature is adjustable by regulator 14 between 380° F. and 400° F. the maximum temperature being limited by the "deep fry" bimetallic strip.

If while at "low fry" the temperature is being regulated by regulator 14 and cold food is placed in the cooking vessel causing a sudden drop in temperature, the "boil" bimetallic strip will close to bring the temperature rapidly back to 300° F. whereupon the regulator re-assumes control.

Due to the persistence of heat in the hot-plate the latter will overheat slightly as it is heated up and there will be a small time lag from the time the appropriate bimetallic strip of contact 12 adjusts to open the circuit to the hot-plate and the coming into control of regulator 14. This is an advantage in practice.

The "off" position of switch 13 is indicated at O.

A pilot light 23 is provided in the circuit in any known or convenient manner.

The control may be applied to gas-heated hot-plates or rings by replacing relay 7 with a solenoid-operated gas valve.

I claim:

A control system for maintaining a selected temperature in an electrical hotplate comprising a transformer, a control switch connected in series with said hotplate and the primary winding of said transformer, a cyclical regulator in series with the secondary winding of said transformer, a heating coil for said cyclical regulator and an energizing coil for said control switch connected in series relationship, the resulting series combination being connected in series with a rectifying means to one terminal of said secondary winding whereby said cyclical regulator periodically controls the energization of said energizing coil and a temperature sensitive safety means in series with said resulting series combination and the opposite terminal of said secondary winding for shutting off the power supply to said hotplate when the temperature of said hotplate exceeds a predetermined value.

References Cited in the file of this patent

UNITED STATES PATENTS

| | | |
|---|---|---|
| Re. 14,286 | Mann | Apr. 17, 1957 |
| 1,391,329 | Lennig | Sept. 20, 1921 |
| 1,451,539 | Forshee | Apr. 10, 1923 |
| 2,602,132 | Young | July 1, 1952 |
| 2,727,973 | Collins | Dec. 20, 1955 |